United States Patent [19]

Jones

[11] 4,031,759
[45] June 28, 1977

[54] METHOD OF, AND APPARATUS FOR, MAKING VISIBLE THE FLOW PATTERN OF A GAS

[75] Inventor: Claude R. Jones, Los Alamos, N. Mex.

[73] Assignee: The United States of America as represented by the Secretary of the Air Force, Washington, D.C.

[22] Filed: Aug. 12, 1976

[21] Appl. No.: 713,748

[52] U.S. Cl. .............................. 73/432 R; 73/119 A
[51] Int. Cl.² ................. G01M 13/00; G01F 15/00
[58] Field of Search .............. 73/432 R, 116, 117.4, 73/147, 119 A

[56] References Cited

UNITED STATES PATENTS 3,081,623  3/1963  Domeisen ...................... 73/119 A

FOREIGN PATENTS OR APPLICATIONS 926,578  5/1963  United Kingdom ............. 73/119 A Primary Examiner—Donald O. Woodiel
Attorney, Agent, or Firm—Joseph E. Rusz; Arsen Tashjian

[57] ABSTRACT

The pattern of the flow of a gas that is injected into a gaseous stream is made visible by causing the flow of the injected gas to become luminous; and, therefore, to be visible, detectable, and recordable. This luminosity is accomplished by producing long-lifetime (metastable), excited-state species (atoms or molecules) of the main gas flow upstream of the injected gas.

10 Claims, 1 Drawing Figure

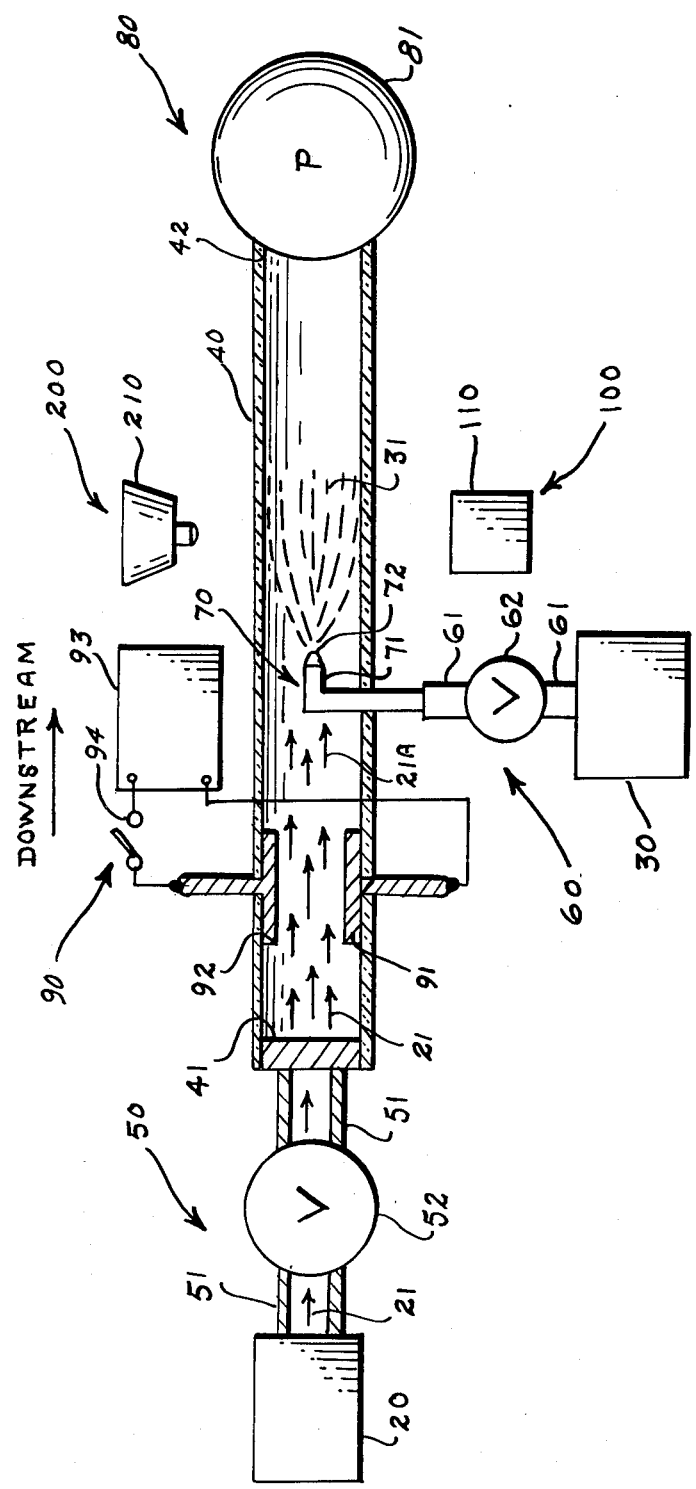

METHOD OF, AND APPARATUS FOR, MAKING VISIBLE THE FLOW PATTERN OF A GAS

STATEMENT OF GOVERNMENT INTEREST

The inventive apparatus, and the inventive method, described herein may be manufactured and used by or for the government for governmental purposes without the payment of any royalty thereon.

BACKGROUND OF THE INVENTION

This invention relates generally to the detection of gases and, more particularly, to a method and an apparatus for making visible the geometry of the flow pattern of a second gas that is introduced into a first gas which is capable of producing long-lifetime (hereinafter referred to as "metastable"), excited state species (hereinafter referred to as "molecules" and "atoms").

In many gas-flow systems, experimental or otherwise (such as a flowing-gas laser), it is often advantageous and/or necessary, to ascertain and to know the geometry of the flow pattern of a gas within a main gaseous flow, such as when a second gas is introduced into the flow of a first gas.

I have invented a method and an apparatus which, by the use of either, will make visible the geometry of the flow pattern of a second gas into a first gas (or a first gaseous mixture).

I have, thereby, significantly advanced the state-of-the-art.

SUMMARY OF THE INVENTION

This invention relates to a method of, and to an apparatus for, making visible the geometry of the flow pattern of a second gas that is introduced into a first gas capable of producing metastable molecules and atoms.

Therefore, the principal object of this invention is to provide such an inventive method and such an inventive apparatus.

This principle object, as well as other equally important and related objects, of this invention will become readily apparent after a consideration of the description of my invention, coupled with reference to the drawing.

DESCRIPTION OF THE DRAWING

The drawing is a top plan view, partially in schematic form, partially in pictorial form, and partially in cross section of a preferred embodiment of my invention, with the flow of gases also represented therein.

DESCRIPTION OF THE PREFERRED EMBODIMENT

With reference to the drawing, therein is shown a basic preferred embodiment 10 of my inventive apparatus.

As can be easily seen the invention 10 comprises: a source 20 of a first gas 21, which said gas is capable of producing metastable molecules and atoms; a source 30 of a second gas 31, the geometric flow pattern of which is to be made visible in the flow of the first gas 21; a translucent reservoir 40 capable of containing the first gas 21 and the second gas 31; means, generally designated 50, for controlling the flow of the first gas 21 from the source 20 to the reservoir 40; means, generally designated 60, for controlling the flow of the second gas 31 from the source 30 to the reservoir 40; means, generally designated 70, for introducing the second gas 31 into the flow of the first gas 21, within the reservoir; means, generally designated 80, for promoting the flow of the first gas 21 and of the second gas 31 into, within, and through the reservoir 40, with the flow promoting means 80 connected to the reservoir 40; and, means, generally designated 90, for producing metastable molecules and atoms of the first gas 21, within the resevoir 40, with the production means 90 connected to the reservoir 40.

More specifically, the first gas can be (as a matter of preference, and not of limitation) helium which of course is housed in the source 20 of the first gas, and the second gas can be (also as a matter of preference, and not of limitation) either nitrogen or hydrogen, which selected gas is housed in the source 30 of the second gas. The translucent reservoir 40 is, preferably, a transparent glass tube having a first open end 41 and a second open end 42. The means 50 for controlling the flow of the first gas 21 from the source 20 of the first gas to the reservoir 40 can comprise a first conduit 51 connecting the source 20 of the first gas 21 to the reservoir 40, and a first openable and closeable valve 52 connected to the first conduit 51 and interposed between the first gas source 20 and the reservoir 40. The means 60 for controlling the flow of the second gas 31 from the source 30 of the second gas to the reservoir 40 can comprise a second conduit 61 connecting the second gas source 30 to the reservoir 40, and a second openable and closeable valve 62 connected to the second conduit 61 and interposed between the second gas source 30 and the reservoir 40. The means 70 for introducing the second gas 31 into the flow of the first gas 21 preferably includes and/or comprises an injector tube 71 which, preferably, has an orifice or hole 72 approximately 10/1000 inch in diameter, and is capable of forming a jet. The means 80 for promoting flow of the first gas 21 and of the second gas 31 into, within and through the reservoir 40 preferably includes and/or comprises a vacuum pump 81. The means 90 for producing metasable molecules and atoms of and from the first gas 21 comprises and/or includes discharge electrodes 91 and 92 connected to a source of electrical energy 93 with an on-off switch 94 interposed therebetween.

In addition, my invention 10 can (but need not) further structurally comprise a means, generally designated 100, for detecting the visible light geometry of the flow pattern of the second gas 31 within the flow of the first gas 21. Such means 100 can consist simply of a light meter 110, such as one of the many well-known types used in the photographic arts.

Also, my invention 10 can (but need not) further structurally comprise a means, generally designated 200, for recording the visible light geometry of the flow pattern of the second gas 31 within the flow of the first gas 21. Such means 200 can consist simply of a photographic camera 210, with suitable film therein, with which the flow pattern of the second gas is photographed and, thereby, is recorded.

DESCRIPTION OF THE INVENTIVE METHOD

The very basic and fundamental steps of my inventive method of making visible the geometry of the flow pattern of a second gas that is introduced into the flow of a second gas which is capable of producing metastable molecules and atoms comprises, essentially, five steps.

Firstly, I introduce the first gas (hereinafter referred to as the "carrier" or the "carrier gas") into a translucent (or transparent) reservoir by suitable means.

Next, I promote the flow of the carrier gas into, within, and through the reservoir, by suitable means.

Then, I produce and promote the production of metastable molecules and atoms (as defined herein previously) of the carrier gas within the resevoir, by suitable means.

Next, I introduce the second gas (hereinafter referred to as the "reactant" or "reactant gas") into the reservoir in the form of a jet stream.

Lastly, I promote the flow of the reactant gas into the flow of the metastable molecules and atoms of the carrier gas, by suitable means.

Thereby, I make visible the geometry of the flow pattern of the reactant gas in the flow of the carrier gas.

MANNER OF USE OF THE PREFERRED EMBODIMENT

The manner of use (and operation) of my inventive preferred embodiment can be ascertained very easily by a person of ordinary skill in the art from the foregoing description, coupled with reference to the drawing.

For others, it is sufficient to say in explanation that the carrier gas (i.e., the first gas) 21 is introduced from its source 20 into the reservoir 40, through first conduit 51, by selectively opening and closing first valve 52. The flow of the carrier gas 21 into and through the reservoir 40 is promoted by the use of vacuum pump 81. The electrical discharge electrodes 91 and 92 are energized (and are discharged) by the source of electrical energy 93 by selectively closing switch 94. With the electrodes 91 and 92 discharging, the carrier gas 21 that is flowing past the electrodes is made to produce (i.e., is broken down into) metastable molecules and atoms, the flow of which is generally designated 21A in the drawing. At a point downstream, as indicated by legend and arrow, of the flow 21A of the carrier gas, the reactant gas (i.e., the second gas) 31 is introduced into the reservoir 41 from its source 30 by selectively opening and closing second valve 62, thereby permitting the carrier gas 31 to flow through second conduit 61 and into and through injector tube 71 as a jet stream. The vacuum pump 81 promotes the flow of the reactant gas 31 into and through the reservoir 41, and also promotes the flow of the reactant gas 31 into the downstream flow 21A of the metastable molecules and atoms of the carrier gas. The geometry of the flow pattern of the reactant gas 31 becomes luminus and colored and, therefore, is now visible. I believe that this phenomenon occurs because the metastable atoms 21A of the carrier gas, which are produced by the electrical discharge, transfer their energy to (i.e., excite) the molecules of the reactant gas 31, thereby causing the reactant gas 31 to emit visible light.

The geometry of the flow pattern of the reactant gas now cannot only be seen by visual inspection, but also can be detected, such as by a light detector 100, and can be permanently recorded by photographing it with a camera 210.

CONCLUSION

It is abundantly clear from all of the foregoing, and from the drawing, that the stated and desired principal object, and other related objects, of my invention have been achieved.

It is to be noted that, although there have been described the fundamental and unique features of my inventive apparatus, as applied to a particular preferred embodiment, other embodiments, adaptations, additions, omissions, and the like will occur to, and can be made by, those of ordinary skill in the art, without departing from the spirit of the inventive apparatus.

Additionally, because of my teaching, it will occur to others of ordinary skill in the art that, in appropriate particular circumstances, the number and/or the sequence of the basic and fundamental steps of my inventive method can be varied (e.g., the third step of producing metastable molecules and atoms of the first gas may be made the fifth, and last, step to be performed), within the teaching of my method. In that regard, it is to be noted the same desired results will be obtained, nevertheless.

What is claimed is:

1. An apparatus for making visible the geometry of the flow pattern of a second gas introduced into a first gas which is capable of producing metastable molecules and atoms, comprising:
    a. a source of said first gas;
    b. a source of said second gas;
    c. a translucent reservoir capable of containing said first gas and said second gas;
    d. means for controlling flow of said first gas, with said flow control means for said first gas interposed between, and connected to, said source of said first gas and said reservoir;
    e. means for controlling flow of said second gas, with said flow control means for said second gas interposed between, and connected to, said source of said second gas and said reservoir;
    f. means for introducing said second gas into the flow of said first gas, within said reservoir, with said second gas introduction means connected to said reservoir;
    g. means for promoting flow of said first gas and of said second gas into and within said reservoir, with said flow promoting means connected to said reservoir;
    h. and, means for producing metastable molecules and atoms of said first gas, within said reservoir, with said production means connected to said reservoir; whereby, when metastable molecules and atoms of said first gas are produced in said reservoir, they transfer their energy to said second gas, thereby causing said second gas to emit visible light, and thereby making visible the geometry of the flow pattern of said second gas.

2. An apparatus, as set forth in claim 1, wherein said translucent reservoir is a transparent glass tube having a first open end and a second open end.

3. An apparatus, as set forth in claim 1, wherein said means for controlling flow of said first gas from said source of said first gas to said translucent reservoir is a first conduit, connecting said first gas source to said reservoir, and a first openable and closeable valve connected to said first conduit and interposed between said first gas source and said reservoir.

4. An apparatus, as set forth in claim 1, wherein said means for controlling flow of said second gas from said source of said second gas to said translucent reservoir is a second conduit, connecting said second gas source to said reservoir, and a second openable and closeable valve connected to said second conduit and interposed between said second gas source and said reservoir.

5. An apparatus, as set forth in claim 1, wherein said second gas introduction means includes an injector tube capable of forming a jet stream.

6. An apparatus, as set forth in claim 1, wherein said means for promoting flow of said first gas and of said second gas includes a vacuum pump.

7. An apparatus, as set forth in claim 1, wherein said means for producing metastble molecules and atoms of said first gas includes discharge electrodes connected to a source of electrical energy.

8. An apparatus, as set forth in claim 1, wherein said apparatus further comprises means for detecting the visible light geometry of the flow pattern of said second gas.

9. An apparatus, as set forth in claim 1, wherein said apparatus further comprises means for recording the visible light geometry of the flow pattern of said second gas.

10. The method of making visible the geometry of the flow pattern of a second gas introduced into the flow of a first gas which is capable of producing metastable molecules and atoms, comprising the steps of:
 a. introducing said first gas into a translucent reservoir;
 b. promoting flow of said first gas within the reservoir;
 c. producing metastble molecules and atoms of said first gas, within the resevoir;
 d. introducing said second gas into the reservoir;
 e. and, promoting flow of said second gas into the flow of said first gas within the reservoir.

* * * * *